United States Patent [19]
Abbott

[11] 4,083,429
[45] Apr. 11, 1978

[54] RETRACTABLE PASSENGER LIFT

[76] Inventor: John D. Abbott, 17469 Parker Rd., Castro Valley, Calif. 94546

[21] Appl. No.: 744,203

[22] Filed: Nov. 22, 1976

[51] Int. Cl.² .............................................. B60P 1/44
[52] U.S. Cl. .................................. 187/9 R; 214/75 R
[58] Field of Search ............... 187/1 R, 9 R, 17, 8.52; 254/144; 214/75 R, 75 H, 75 T

[56] References Cited

U.S. PATENT DOCUMENTS

| 586,641 | 7/1897 | Underwood | 214/75 T |
|---|---|---|---|
| 1,952,906 | 3/1934 | Bristol | 187/8.52 |
| 2,536,080 | 1/1951 | Patton | 214/75 T |
| 3,651,965 | 3/1972 | Simonelli et al. | 214/75 T X |
| 3,872,948 | 3/1975 | Richards | 187/8.52 |
| 3,912,048 | 10/1975 | Manning | 187/9 R |
| 3,952,974 | 4/1976 | Lang | 214/75 T X |

Primary Examiner—Johnny D. Cherry
Assistant Examiner—James L. Rowland
Attorney, Agent, or Firm—Robert R. Tipton

[57] ABSTRACT

A retractable passenger lift for a vehicle for use by a wheelchair passenger utilizes a generally flat horizontally disposed passenger carrying platform adapted to be hung from cables which is supported from a support bracket assembly containing the means for raising and lowering the platform which assembly is retracted to a position under the floor of the vehicle when not in use.

7 Claims, 12 Drawing Figures

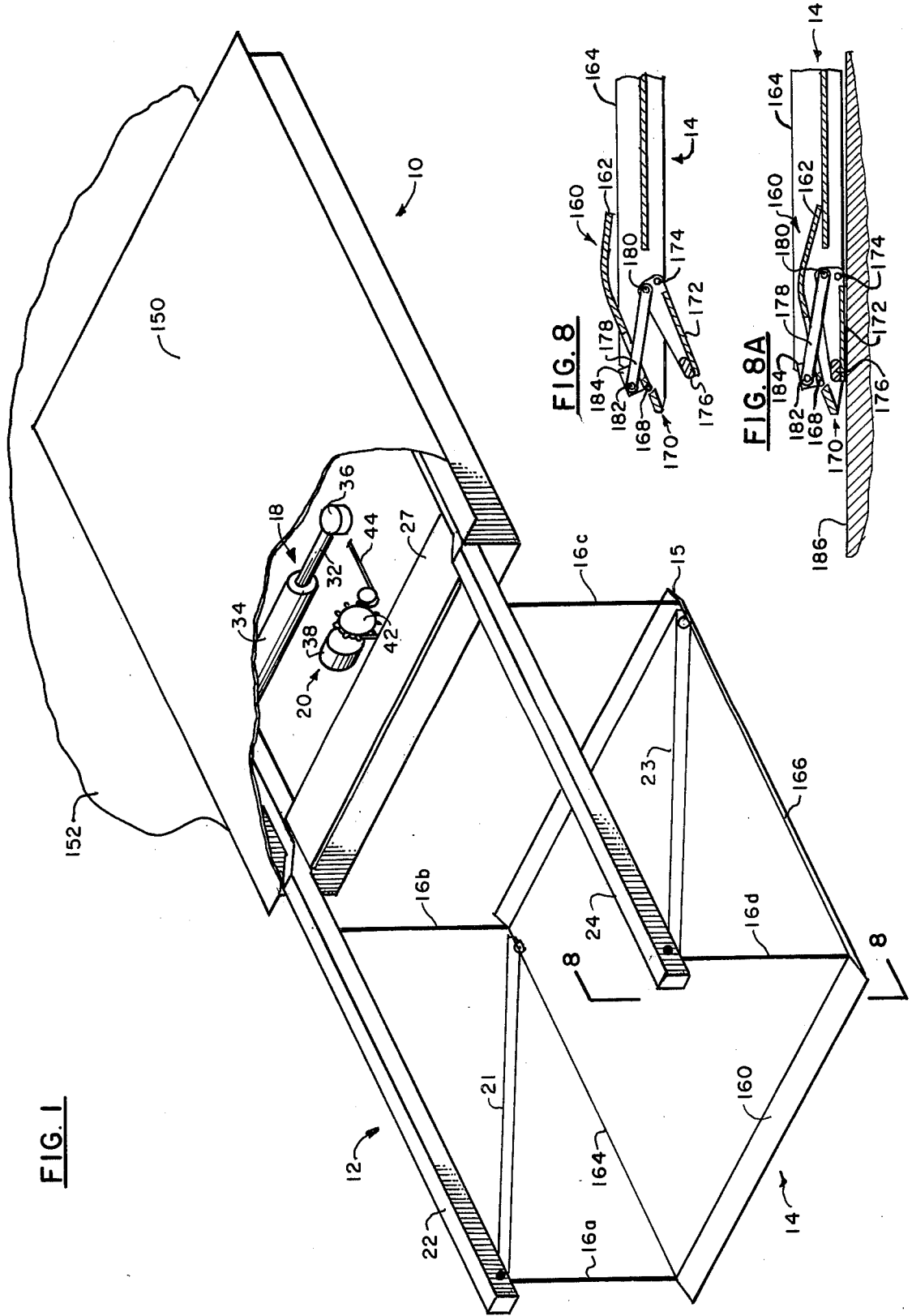

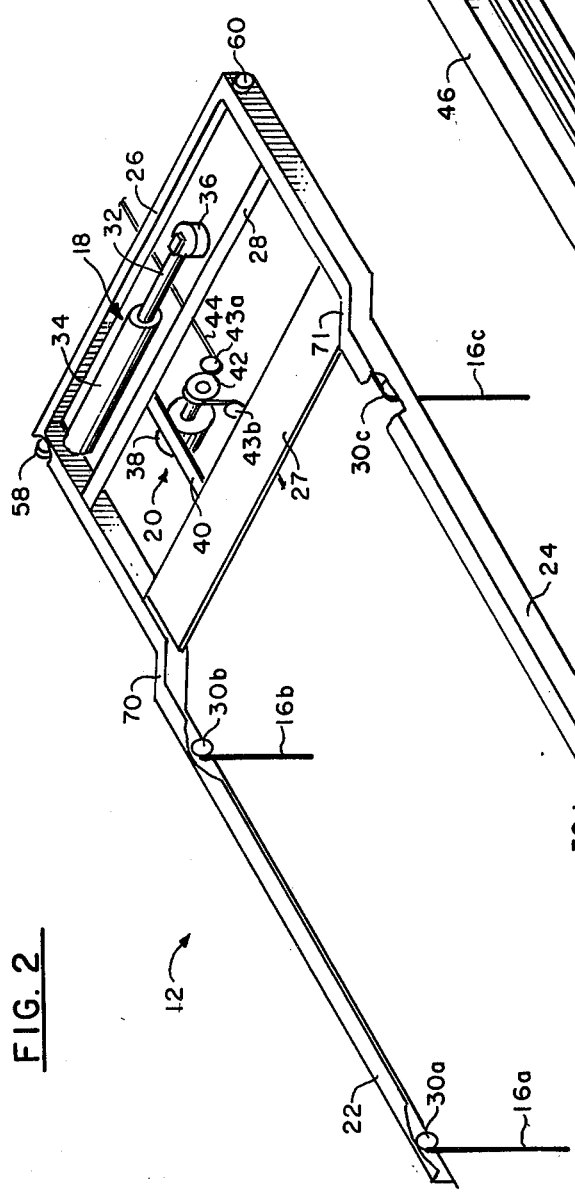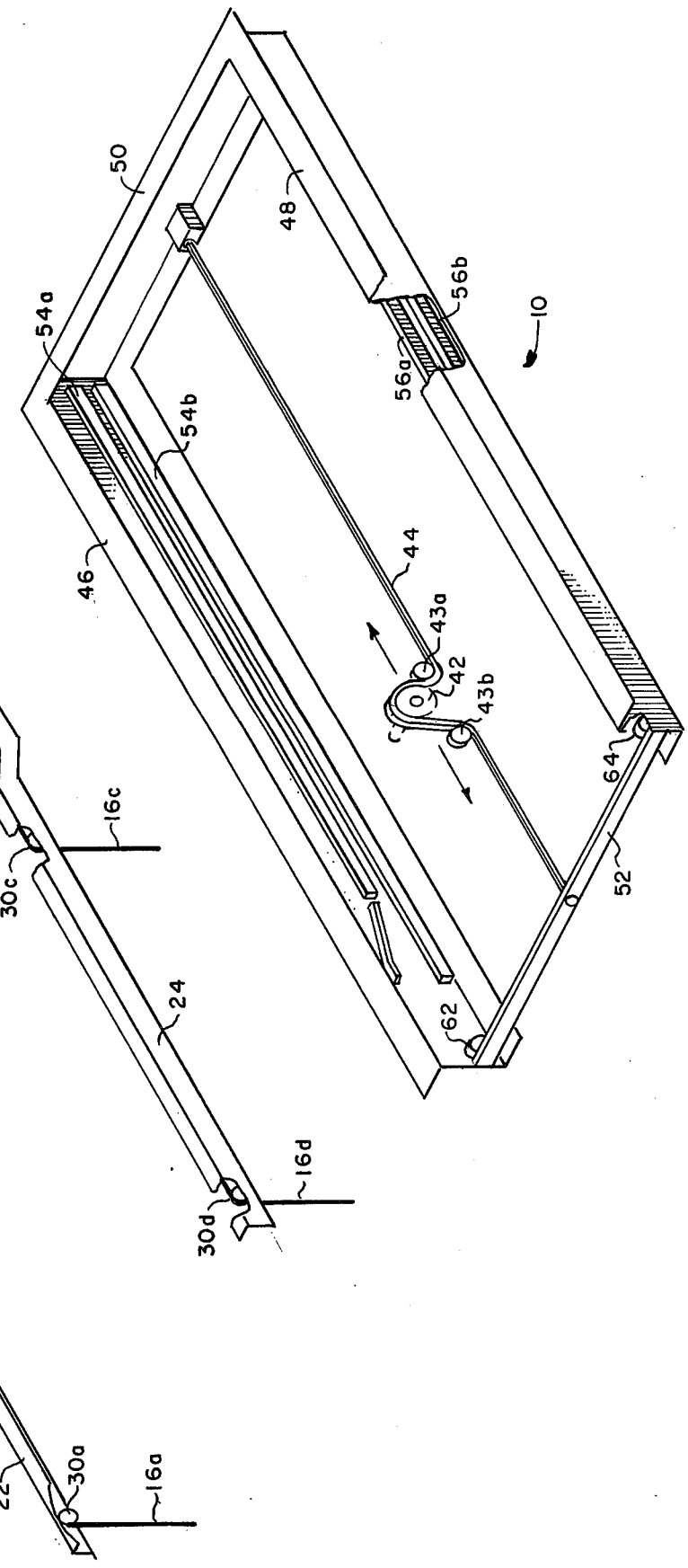

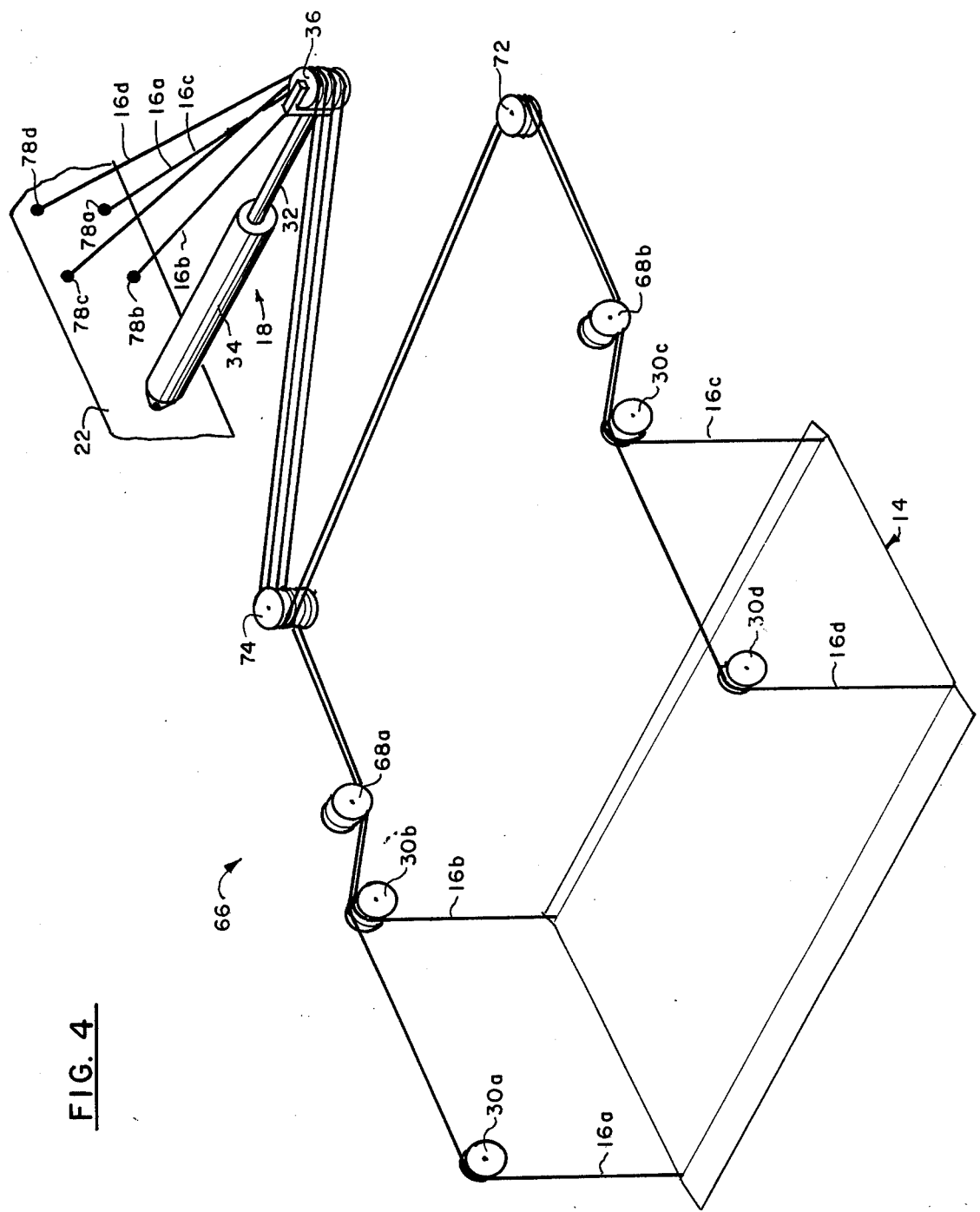

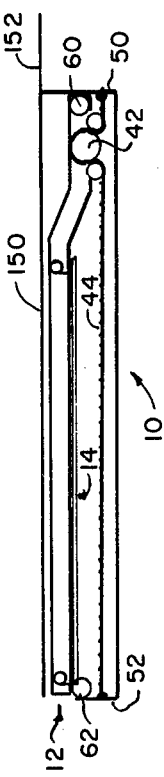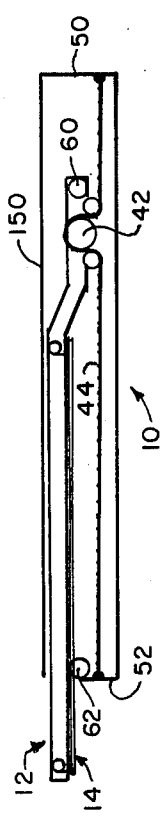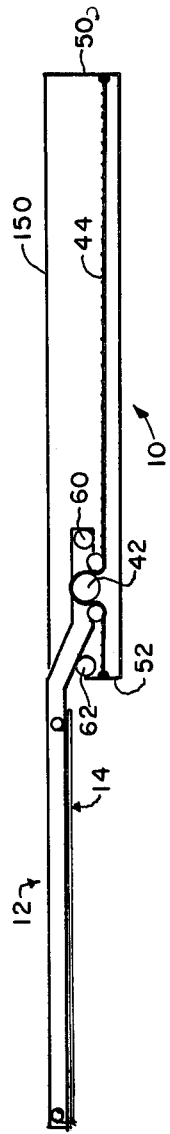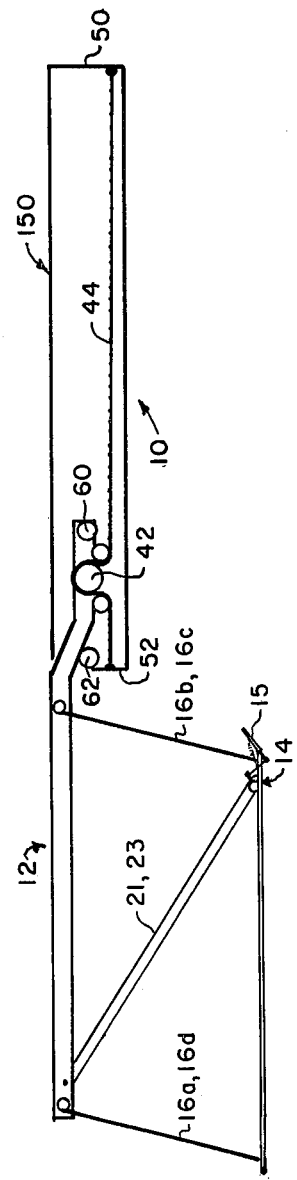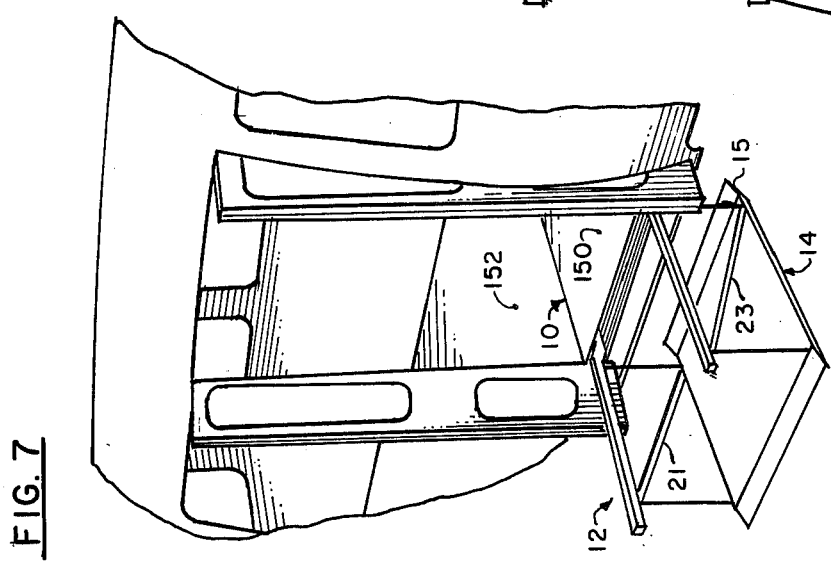

RETRACTABLE PASSENGER LIFT

BACKGROUND OF THE PRIOR ART

This invention relates generally to lift platforms and in particular to platforms for lifting passengers in wheelchairs onto a public conveyance or other vehicle and which is also retractable into the floor of said vehicle.

The lifting platforms of the prior art generally include various configurations comprising a generally horizontal platform which is raised and lowered on the outside of the vehicle using a parallelogram arrangement to maintain the platform in the horizontal position and other devices which cause the platform, after it is raised, to be folded vertically either inside the vehicle or immediately outside the vehicle.

In some cases the lifting and lowering mechanism is attached to the underside of the vehicle however the platform itself when retracted is folded up against the outside of the vehicle.

Some devices even go so far as to provide hinges in the platform for it to articulate and fold up inside the cab of the vehicle. In other cases the door of the vehicle is used as the lifting platform such that it remains horizontal when lifting the passenger onto the vehicle and then converts to the vertical position and closes as a door in the side of the vehicle.

All these prior art devices have the disadvantage of occupying a space within the interior of the vehicle or projecting from the exterior of the vehicle or requiring special design for each vehicle in which they are installed.

SUMMARY OF THE INVENTION

The apparatus of the present invention utilizes a horizontally disposed platform which is raised and lowered by cables and, when raised, can be retracted in the horizontal position to a location under the floor of the vehicle.

The device of the present invention generally comprises a flat, horizontally disposed, passenger carrying platform adapted to be hung by cables from a support bracket assembly containing the means for raising and lowering the platform, which assembly is retractable into a compartment under the floor of the vehicle.

It is therefore an object of the present invention to provide a retractable passenger lift for a vehicle.

It is a further object of the present invention to provide a retractable passenger lift for a vehicle which is retractable to a position under the passenger floor of the vehicle.

It is still a further object of the present invention to provide a retractable passenger lift for a vehicle in which the platform remains horizontal at all times when being raised or lowered and retracted.

These and other objects of the present invention will become manifest upon study of the following detailed description when taken together with the drawings.

BRIEF DESCRIPTION OF THE DRAWINGS

FIG. 1 is an isometric, partial cutaway, view of the apparatus of the present invention as removed from the vehicle.

FIG. 2 is an isometric view of the support bracket assembly of the present invention.

FIG. 3 is an isometric view of the containment compartment assembly of the present invention.

FIG. 4 is an isometric diagrammatic illustration of the tackle system of the present invention.

FIGS. 5A, 5B, 5C and 5D are vertical, cross-sectional, elevational views of the retractable passenger lift device of the present invention showing diagrammatically the positions of the device at various stages of operation.

FIG. 7 is an isometric, partial cutaway view showing the installation of the device of the present invention in a vehicle.

FIGS. 8 and 8A are elevational partial sectional views taken at lines 8—8 of FIG. 1 of the passenger carrying platform safety barrier apparatus.

DESCRIPTION OF THE PREFERRED EMBODIMENT

Figure 6:
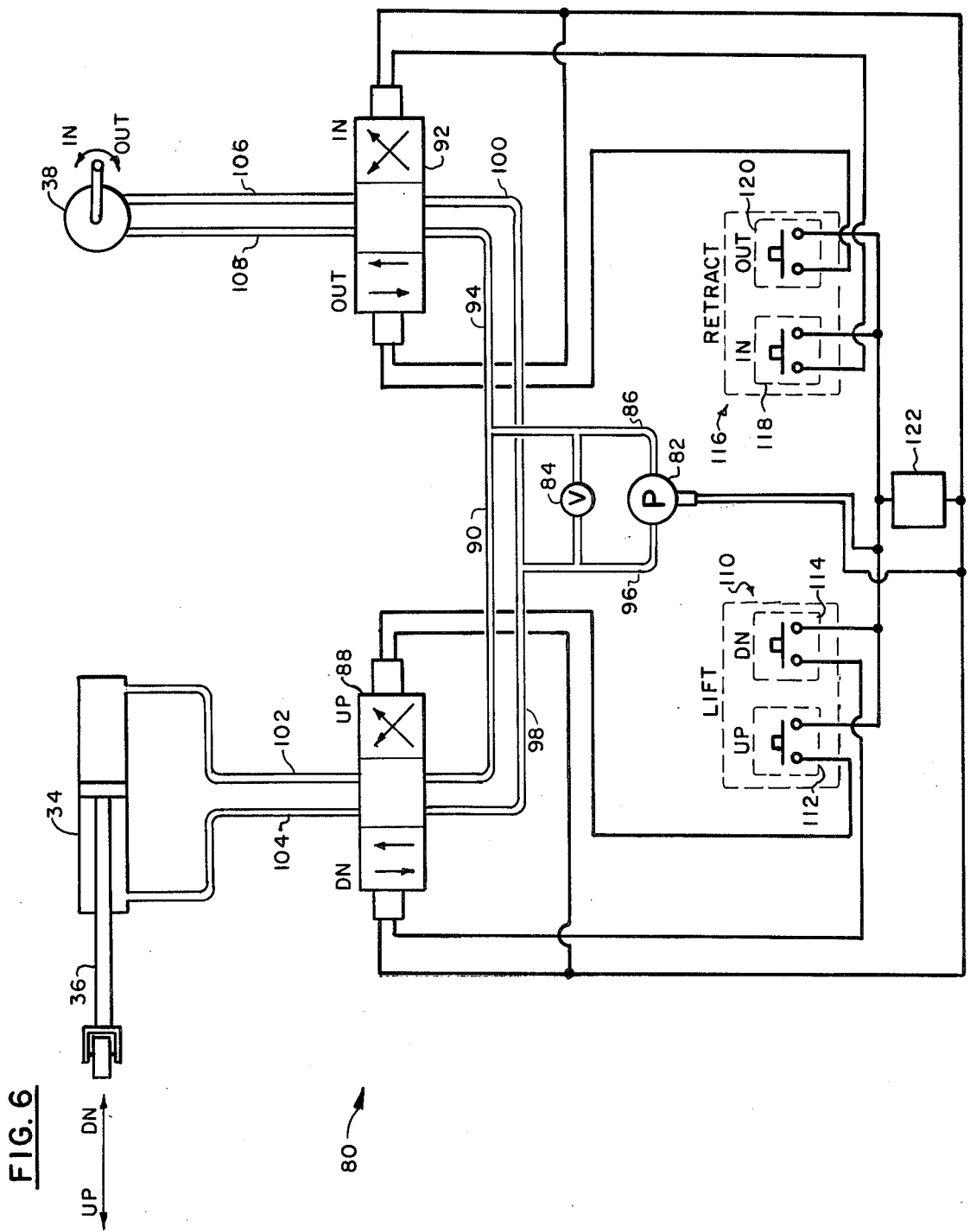
FIG. 6 is a diagrammatic illustration of the hydraulic control and operating system for the present invention.

With reference to FIG. 1 there is illustrated an isometric view of the retractable passenger lift device of the present invention which comprises, basically, a containment compartment assembly 10 into which is arranged support bracket assembly 12 which support bracket is adapted to be retracted into compartment 10, with a generally flat horizontally disposed passenger carrying platform 14 adapted to be hung by cables 16a, 16b, 16c, and 16d from support bracket assembly 12.

A lift mechanism 18 is located at one end of support bracket assembly 12 within containment compartment 10 and is used for raising and lowering platform 14.

A retracting mechanism 20 is also located on support bracket assembly 12 in the portion within containment compartment assembly 10.

Side braces 21 and 23 are hinged, respectively, at their upper ends to support arms 22 and 24, and at their lower ends to platform 14 proximate the point of attachment of cables 16b and 16c.

With reference to FIG. 2, there is illustrated an isometric view of support bracket assembly 12 by itself, showing greater detail of its construction. In particular, support bracket 12 comprises a pair of parallel arranged spaced apart support arms 22 and 24 held in their parallel spaced apart relation by spreader brackets 26, 27 and 28.

To guide cables 16a, 16b, 16c and 16d used for raising and lowering platform 14, a set of pulleys 30a, 30b, 30c and 30d, are located at corresponding points on arms 22 and 24 above the corresponding corners of platform 14 and are reeved, respectively, with cables 16a, 16b, 16c and 16d.

Lifting mechanism 18, comprises, basically, hydraulic piston 32 combined with hydraulic cylinder 34 which cylinder is attached at one end to arm 22 while the free end of piston 32 is connected to pulley 36. Pulley 36 is reeved with cables 16a, 16b, 16c and 16d as shown in greater detail in FIG. 4.

Retracting mechanism 20, in the present case a rotary hydraulic device, comprises, basically, hydraulic motor 38 which is attached to bracket 40 whose ends are respectively attached to spacer brackets 28 and 27. Motor 38 is also connected to sprocket wheel 42 which engages sprocket chain 44 which is, in turn, attached to containment compartment 10 shown in greater detail in FIG. 3.

With reference to FIG. 3, containment compartment assembly 10 comprises, basically, a pair of parallel arranged side supports 46 and 48 which are held apart in their spaced apart relation by rear end bracket 50 and front end bracket 52.

Attached to the inside surface of side members 46 and 48 are upper and lower guides 54a and 54b, respectively, attached to side member 46 with corresponding guides 56a and 56b attached to side member 48. Guides Members 54a, 54b and 56a, 56b are adapted to receive, respectively, roller bearings 58, connected to the outside end of support arm 22 proximate bracket 26 (FIG. 2), and roller bearing 60 connected to the outside edge of support arm 24 proximate spacer bracket 26 (FIG. 2).

Still with reference to FIG. 3, sprocket chain 44 is connected at one end to spacer bracket 50 and at its other end to spacer bracket 52. An open loop or bend is shown in sprocket chain 44 which would correspond to the location of sprocket wheel 42 shown dotted in FIG. 3, which is attached to hydraulic motor 38 (not shown in FIG. 3), which, in turn, is attached to support bracket assembly 10 such that rotation of hydraulic motor 38 would cause sprocket 42 to "walk" up and down sprocket chain 44 toward and away from rear bracket 50. It can be seen that such movement would move support bracket assembly 12 into and out of containment compartment 10.

Tension is maintained on sprocket chain 44 using idler sprocket wheels 43a and 43b, also connected to support bracket assembly 12.

To further guide support arms 22 and 24 of support bracket assembly 12 into and out of containment compartment 10, a set of roller guides 62 and 64 are provided, respectively, on the inside walls of side brackets 46 and 48 proximate front bracket 52.

With reference to FIG. 4, there is illustrated the tackle system 66 used to raise and lower platform 14.

Tackle system 66 comprises the previously described set of pulleys 30a, 30b, 30c, and 30d which are connected to support arms 22 and 24 (FIG. 2) and also idler pulleys 68a and 68b to allow for the jog or transition 70 and 71 (FIG. 2) in support arms 22 and 24, respectively, idler pulley 72 which is adapted to receive cables 16c and 16d; idler pulley 74 which is adapted to receive cables 16a and 16b as well as cables 16a and 16b and cables 16d and 16c after passing over idler pulley 72 and idler pulley 36 which is attached to piston 32 and, in conjunction with cylinder 34, is used to raise and lower platform 14.

As shown in FIG. 4, one end of cables 16a, 16b, 16c and 16d are attached, respectively, to anchor points 78a, 78b, 78c, and 78d, while the other end of the respective cables are connected to corresponding corners of platform 14.

In particular, cable 16a is reeved over pulley 30a, then over pulley 30b, 68a then under idler pulley 68a around idler pulleys 74 and 36 to anchor point 78a.

Cable 16b is reeved over pulley 30b, under idler pulley 68a and around idler pulleys 74 and 36 to be anchored at anchor point 78b.

Cable 16c is reeved over pulley 30c, then under idler pulley 68b, around idler pulleys 72, 74, and 36, to be anchored at anchor point 78c.

Cable 16d is reeved over pulley 30d, then over pulley 30c, under idler pulley 68b, around idler pulleys 72, 74, and 76, to be anchored at anchor point 78d.

With reference to FIG. 6 there is illustrated the hydraulic system of 80 of the present invention in diagrammatic form which controls the operation of hydraulic cylinder 34 and piston 32 for lifting platform 14, and hydraulic motor 38 for extending and retracting support arm assembly 12.

Hydraulic system 80 comprises basically an hydraulic pump 82 which is driven by a prime mover (not shown) which can be either the vehicle engine or an electric motor connected to the vehicle electrical system.

Although many hydraulic systems can be used, the particular system illustrated uses a continuous pressure system in which the hydraulic pump is in operation and pressure relieved in the pump circuit by pressure relief valve 84. During the lifting or retracting cycles pressure relief valve 84 is by-passed to operate the various hydraulic devices.

Hydraulic pump 82 is connected on its high pressure side to conduit 86 which provides hydraulic pressure to lift control solenoid valve 88 through conduit 90 and retract control solenoid valve 92 through conduit 94. Low pressure return conduit 96 is connected to the input or low pressure side of pump 82 and receives hydraulic fluid from lift control solenoid valve 88 through return conduit 98 and from retract control solenoid valve 92 through return conduit 100.

Lift valve 88 is connected to hydraulic cylinder 34 through conduits 102 and 104 while retract valve 92 is connected to hydraulic motor 38 through conduits 106 and 108.

Solenoid valve 88 is controlled by lift push button station 110 in which "up" push button 112 controls the "up" side of valve 88 and "down" push button control 114 operates the "down" portion of solenoid valve 88.

In a similar manner retract solenoid valve 92 is controlled by push button station 116 in which "in" push button station 118 controls the "in" side of retract solenoid valve 92 and "out" push button station 120 controls the "out" side of retract solenoid valve 92.

A power supply 122 is used to energize the various sides of solenoid valves 88 and 92.

To prevent a wheelchair passenger riding on platform 14 from accidentally rolling off the platform while it is in operation, a safety barrier 160 is provided as shown in FIGS. 8 and 8A and is located on the outboard edge of platform 14 as shown in FIG. 1.

In FIG. 8, the apparatus is shown with the barrier raised to prevent a wheelchair from rolling off the platform, while in FIG. 8A, the apparatus is shown in its lowered position to permit wheelchairs to roll both on and off platform 14.

With reference to FIG. 8, safety barrier 160 comprises, basically, a movable barrier member 162, which is adapted to rotate about pivot 168 connected between side members 164 and 166 of platform 14. Pivot 168 is generally located proximate the outboard edge 170 of platform 14. Safety barrier apparatus 160 further comprises a weighted actuating arm or member 172 which is also pivotally connected to side members 164 and 166 by pivot 174. Mounted on the outboard edge of actuating arm or member 172 is a weight 176 to cause actuating member 172 to rotate in a counterclockwise direction. Safety barrier apparatus 160 further comprises a link member 178 which is connected between movable barrier 162 and actuating member 172 having respective ends thereof pivotally connected by pivot pin 180 to actuating member 170 and spaced apart therefrom but proximate pin 174, and pivot pin 182 connected to safety barrier 162 and spaced apart but proximate pivot pin 168 using spacer block 184.

As can be seen from FIG. 8, when platform 14 is in the raised position, actuating member 172 is caused to partially rotate in a counterclockwise direction around pivot pin 174 through the lowering of weight 176 which, in turn, causes link member 172, in conjunction with pivot pin 182 and spacer block 184 to lift or rotate safety barrier 162 in a counterclockwise direction around pivot pin 168. Thus, a wheelchair is prevented from rolling off the outboard edge of platform 14 by the raised barrier member 162.

With reference to FIG. 8A, when platform 14 is lowered to rest on a surface or pavement 186, actuating member 172 is caused to rotate in a clockwise direction to rest flat on surface 186 thereby causing link member 178, in conjunction with pivot pin 182 and spacer block 184, to rotate safety barrier 162 in a clockwise direction lowering it down to permit a wheelchair to roll off platform 14.

To operate the passenger lift apparatus of the present invention, beginning from the retracted position, "out" push button 120 is operated to activate the "out" side of retract solenoid valve 92 to permit hydraulic fluid to flow through hydraulic motor 38 causing it to rotate in a direction for sprocket wheel 42 to "walk" away from end bracket 50 (FIG. 3) towards end bracket 52.

Thus, with reference to FIG. 5A showing support bracket assembly 12 fully retracted in containment compartment 12, it has now moved partially outward as shown in FIG. 5B such that support arm 22 is partially exposed beyond front end bracket 52.

When fully extended as shown in FIG. 5C, spacer bracket 27 of support bracket assembly 12 is shown adjacent front end bracket 52 of containment compartment 10 with platform 14 still in the fully raised position adjacent support arms 22 and 24.

When in the fully extended position as shown in FIG. 5C, the "down" push button 114 of lift push button station 110 is operated to activate the "down" side of lift solenoid valve 88 causing fluid to flow into conduit 102 to retract piston 32 into cylinder 34. Thus, as can be seen from FIG. 4, idler pulley 36 is pulled towards anchor points 78a, 78b, 78c, and 78d permitting cable 16a, 16b, 16c and 16d become slack and to pass outwardly around idler pulleys 74, 72, 68a, and 68b lowering platform 14, as shown in FIG. 5D to a position permitting a passenger to embark or disembark from platform 14.

It will be noted in FIG. 5D that platform 14 is extended outboard away from compartment 10 and the vehicle due to the hinged rotating action of side braces 21 and 23. It can be seen that side braces 21 and 23 provide a further stabilization of platform 14 while also further extending platform 14 away from the vehicle. It has also been found that side braces 21 and 23 permit safe operation of the loaded platform in the event of failure of one of cable 16a, 16b, 16c or 16d. In addition, they also are used to actuate inboard platform safety barrier 15.

To reverse the cycle, "up" push button 112 of "lift" push button station 110 is activated to operate the "up" side of lift solenoid valve 88 causing hydraulic fluid to enter the other side of piston 32 in cylinder 34 to extend piston 32 and idler pulley 36 away from anchor points 78a, 78b, 78c and 78d pulling cables 16a, 16b, 16c and 16d inwardly over pulleys 30a, 30b, 30c, 30d, 68a, 68b, 72 and 74, to raise platform 14 to its retracted position shown in FIG. 5C.

"In" push button 118 of push button station 116 is then operated to activate the inside of retract solenoid valve 92 causing hydraulic motor 38 to now rotate in the opposite direction whereby sprocket wheel 40 is caused to "walk" along sprocket chain 44 from front spacer bracket 52 toward back spacer bracket 50 so that support bracket member 12 is pulled into containment compartment 10 as shown in FIG. 5B, until it is fully retracted within compartment 10 as shown in FIG. 5A.

As can be seen in FIG. 1 containment compartment 10 is enclosed on its top side by cover 150, which is arranged flush with the floor 152 of the vehicle, and which is also adapted to support the weight of passengers walking thereon.

With reference to FIG. 7, there is illustrated the manner in which the retractable passenger lift device of the present invention is installed in a vehicle showing the vehicle in partial cutaway. As can be seen from FIG. 7, containment compartment 10 fits conveniently into the floor of the vehicle to provide a storage space for the support bracket assembly 12 and platform 14 where it does not interfere with passenger traffic.

I claim:

1. A retractable passenger lift for a vehicle comprising means defining a containment compartment assembly having a top surface, rear end bracket and front end bracket, said compartment assembly located with said top surface proximate the floor level of said vehicle, a support bracket assembly connected to said containment compartment and adapted to be retractable into said compartment, a generally flat, horizontally disposed, passenger carrying platform adapted to be hung by cables from said support bracket assembly, means for raising and lowering said platform, and means for extending and retracting said support bracket assembly out of and into said containment compartment.

2. The apparatus as claimed in claim 1 wherein said support bracket assembly comprises a pair of first and second parallel arranged support arms supported by said containment compartment and movable horizontally into and out of said compartment.

3. The apparatus as claimed in claim 1 wherein said means for raising and lowering said platform comprises a tackle system comprising a set of pulleys reeved with cables attached to said platform, with said pulleys connected to said support bracket assembly, and means connected to said tackle system for raising and lowering said platform.

4. The apparatus as claimed in claim 2, further comprising a pair of first and second spaced apart pulleys connected to said first support arm, a pair of third and fourth spaced apart pulleys connected to said second support arm, first, second, third, and fourth cables, respectively, reeved over said first, second, third, and fourth pulleys and having one end, respectively, attached to said platform and having the other end of said cable attached to said support bracket assembly at a common anchor location, a first change of direction idler pulley adapted to be reeved with said first and second cables and located between said first and second pulleys and said common anchor location, a second change of direction idler pulley adapted to be reeved with said first, second, third and fourth cables and located between said first idler pulley and said common anchor location, and wherein said means for raising and lowering said platform comprises a third idler pulley adapted to be reeved with said first, second, third and fourth cables and located between said second idler pulley and said common anchor location, and means for moving said third idler pulley toward and away from said common anchor location.

5. The apparatus as claimed in claim 4 wherein said means for moving said third idler pulley comprises an hydraulic cylinder and piston assembly having one end connected to said support bracket assembly proximate said anchor location and having the other end connected to said third idler pulley.

6. The apparatus as claimed in claim 1 wherein said means for extending and retracting said support bracket assembly out of and into said containment compartment comprises an elongated flexible member having one end attached to the front end of said containment compartment and having the other end connected to the rear end of said containment compartment, a rotating member adapted to engage said elongated flexible member between the points of connection of said elongated flexible member to said containment compartment, means attached to said support bracket assembly for rotating said rotating member back and forth whereby said rotating member "walks" along said elongated flexible member for movement of said support bracket assembly into and out of said containment compartment.

7. The apparatus as claimed in claim 6 wherein said means for rotating said rotating member comprises an hydraulic motor, and wherein said hydraulic motor and said means for raising and lowering said platform further comprises an hydraulic system comprising means defining a conduit system containing hydraulic fluid, said system connected to said hydraulic motor and said means for raising and lowering said platform, an hydraulic pump adapted to pump said hydraulic fluid through said conduit system, a first flow reversing hydraulic solenoid valve connected in said conduit system to said hydraulic motor, a second flow reversing hydraulic solenoid valve connected in said conduit system to said means for raising and lowering said platform, and means for activating said first and second flow reversing hydraulic solenoid valves sequentially to extend said support bracket assembly, lower said platform, raise said platform, and retract said support bracket assembly into said containment compartment.

* * * * *